F. P. WARREN & E. FIELD.
COMPOSITION SHEATHING FOR VESSELS.
No. 192,037.                          Patented June 12, 1877.
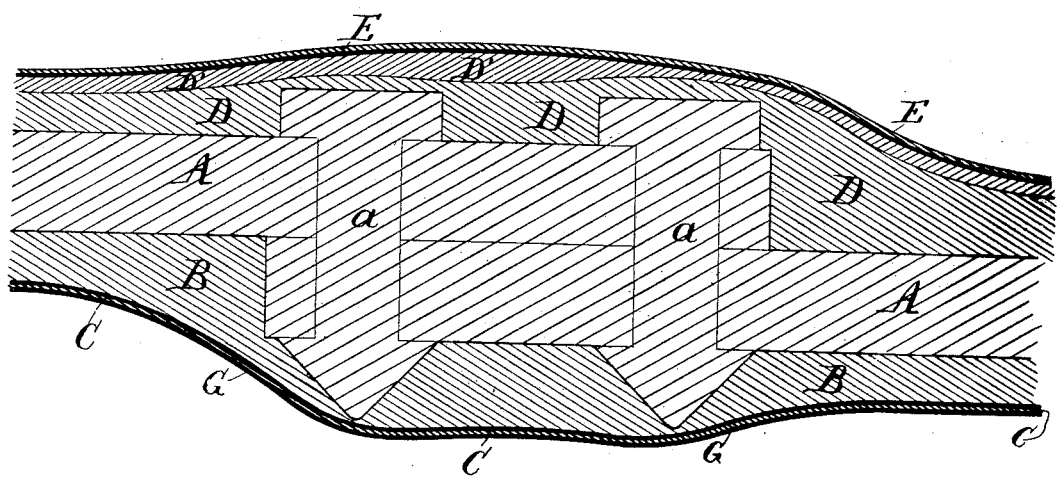

UNITED STATES PATENT OFFICE.

FREDERIC P. WARREN, OF SOUTHSEA, AND EDWARD FIELD, OF ADELPHI, GREAT BRITAIN, ASSIGNORS TO SAID EDWARD FIELD.

IMPROVEMENT IN COMPOSITION SHEATHING FOR VESSELS.

Specification forming part of Letters Patent No. 192,037, dated June 12, 1877; application filed January 4, 1877.

*To all whom it may concern:*

Be it known that we, FREDERIC PELHAM WARREN, of Southsea, in the county of Hants, Kingdom of Great Britain and Ireland, and EDWARD FIELD, of Chandos Chambers, Adelphi, in the county of Middlesex, Kingdom of Great Britain and Ireland, have invented certain new and useful improvements in covering the surfaces of ships or vessels, to protect them from incrustation or adherence of organic matters and from corrosion, which improvements are fully set forth in the annexed specification.

This invention has for its object improvements in covering the surfaces of ships or vessels, to protect them from incrustation or adherence of organic matters, and from corrosion.

For this purpose we coat the surface to be protected with a layer or layers of cement, upon which we superpose a layer of paper, which paper, when used on the exterior of a submerged vessel or body, constitutes the sheathing or outer covering in direct contact with the water in which such vessel or body is immersed.

We have found that the following constitutes an efficient method of covering the external surface of an iron structure intended for use in contact with sea-water, to protect that surface from marine growth and organic incrustation, (fouling.) The surface to be protected is first scraped clean, and is then coated with a layer of cement, composed of sifted stone-lime, quick or slaked, (the latter is preferable,) intimately mixed with good Stockholm tar. We find it advantageous to add about one-tenth part, by weight, of gas-tar.

The proportions, by weight, which we consider to be the best are, one part of lime to from three and a half to four and a half parts of tar, or of the tar mixture.

In cold weather, the tar may be warmed to liquefy it sufficiently for mixing.

In slaking the lime, we have obtained the best results by using one part of water to from four to four and a half parts of stone-lime, by weight.

After slaking the lime it is sifted, and in the sifting operation we usually add for coloring-purposes about half an ounce of crocus to the pound of lime.

The cement when well mixed should be laid on quickly by a plasterer, and the paper should be immediately placed upon the cement.

We consider it preferable to coat with waterproof substance—such as marine glue—that surface of the paper which is intended to be laid against the cement. The said glue hardens before the glued surface of the paper is placed on the cement. Indeed, this coating of marine glue, or its equivalent, is necessary when sheathing or covering on our plan ships or vessels intended for use wholly or partially in contact with fresh water, as distinguished from sea water only.

A piece of board should be placed on the paper, and hammered all over, so as to insure good contact of the paper with the cement, or a mallet with an india-rubber or other resilient face may be used.

The paper we use is generally known as "sheathing-paper." The less foreign matter it contains the better. A good paper for the purpose is comparatively soft, porous, and rather thick. The paper we have used is of the same description as that used by the British admiralty to form intermediate layers between the hulls and the outer sheathing of sea-going vessels built of wood.

If the cement be required to harden quickly, a larger proportion of lime must be used than in the case of the cement being required to be of a tough nature, and the gas-tar may in this case be omitted.

The composition of the cement may be otherwise varied—as for instance, by substituting Archangel tar for the Stockholm tar.

The intimate admixture of the lime with the tar may be effected in a mixing-mill, just before the cement is to be used. We have found, by experiment, that cement composed of a mixture of slaked stone-lime, Stockholm tar, and gas-tar, as described, will adhere firmly to wet iron, and that thick paper laid upon such a coating of cement will adhere immediately, and in the course of a few hours become sufficiently hard.

Our invention is equally applicable to the interiors of iron ships.

A ship may be looked upon as a huge condenser, the temperature of the interior being some 10° or 15° (more or less) higher than that of the water in which the vessel floats, consequently moisture is always accumulating on the iron walls of the interior.

This, in a short time, seriously oxidizes the metal, and eventually destroys the vessel.

Various means have been tried with a view to obviating this defect.

Among the means proposed, we may instance the use, respectively, of powdered cork and of wood linings. The main object is to give the interior surface of the vessel a waterproof non-conducting covering at a cheap rate. The cork lining, to some extent, answers the purpose, but is costly, and somewhat difficult of application. The wood is found not to intercept moisture to the extent that is desirable.

Now, in applying our invention for this purpose, we first lay on, where needful, cement of a rather thicker consistency than that hereinbefore specified, so as to produce a comparatively even (though it may be undulating) surface, thus burying in the cement the rivet-heads, plate-edges, and other similar inequalities to which the paper would not readily accommodate itself. This having been done, and the cement having set firmly, a thin coat of cement should be applied over the entire surface, not only of the cement already laid on, but also of the intervening portions of the uncoated interior part of the vessel to be protected, then the paper should be immediately laid on this last-mentioned coating of cement.

The exposed surface of the paper, if intended to be painted, must be thoroughly sized before the paint is applied. The result of this method of lining will be to give a non-conducting surface to the interior of the vessel, and the moisture will not accumulate and run down the walls of the vessel to the extent now usual.

We desire it to be understood that the application of our invention is not limited to the protection of ships or vessels composed of iron. It may be used for wooden vessels; also, that we do not intend to confine ourselves to the precise composition of the cement above described, nor to the use of the peculiar paper specifically mentioned, as it will be evident the kind of paper may be varied according to the purpose the coating is intended to serve.

The accompanying drawing forms a part of this specification, and represents a cross-section through a portion of the ship's bottom.

A A are the plates forming the skin of the ship, held together by rivets $a$. B is a coating of the lime and tar compound, and C is a layer of paper exterior thereto. All this is on the outside of the ship. D is a coating of the thick cement on the interior of the ship's bottom; D′, the thin coat of cement applied over the first, and E a layer of paper applied thereon. The water-proof glue is indicated by an extra thick black line. The heavy line below the paper on the outer surface represents paint, and is marked G.

What we claim as our invention is—

1. The within described protector to prevent incrustation, corrosion, &c., on surfaces of vessels, consisting in an external covering of paper, and an intermediate layer of cement, as and for the purpose specified.

2. The layer or coating of cement, the layer of paper, the coating of size, and the coating of paint, all arranged and combined as specified, for the purpose set forth.

FREDERIC P. WARREN.
EDWARD FIELD.

Signed by the said Frederic Pelham Warren in the presence of—
GEORGE W. CUMING,
    *of Athol House, Turbiton, Esquire.*
E. WOOD,
    7 *Clarendon Place Landport, Portsmouth, Gentleman.*

Signed by the said Edward Field in the presence of—
W. LLOYD WISE,
    *Patent Agent, London.*
J. WALT,
    69 *King William street, London, E. C.*